(12) United States Patent   (10) Patent No.: US 12,567,234 B2
Karube   (45) Date of Patent: Mar. 3, 2026

(54) TEACHER DATA COLLECTING METHOD AND COLLECTING DEVICE

(71) Applicant: HONDA MOTOR CO., LTD., Tokyo (JP)

(72) Inventor: Toshikazu Karube, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 329 days.

(21) Appl. No.: 18/188,618

(22) Filed: Mar. 23, 2023

(65) Prior Publication Data

US 2023/0316717 A1   Oct. 5, 2023

(30) Foreign Application Priority Data

Mar. 29, 2022   (JP) ................................. 2022-052787

(51) Int. Cl.
*G06V 10/764* (2022.01)
*G06V 10/77* (2022.01)
*G06V 10/82* (2022.01)

(52) U.S. Cl.
CPC ........ *G06V 10/764* (2022.01); *G06V 10/7715* (2022.01); *G06V 10/82* (2022.01)

(58) Field of Classification Search
CPC .. G06V 10/764; G06V 10/7715; G06V 10/82; G06V 10/772; G06V 10/776;
(Continued)

(56) References Cited

U.S. PATENT DOCUMENTS

2018/0365089 A1   12/2018   Okanohara
2020/0020098 A1 *   1/2020   Odry ..................... G06T 7/0012
(Continued)

FOREIGN PATENT DOCUMENTS

CN   112789499 A   5/2021
JP   2009110064 A *   5/2009
(Continued)

OTHER PUBLICATIONS

Yuting, L., "Industrial process modeling and monitoring with limited data" Zhejiang University (Jan. 2022) pp. 1-147.
(Continued)

*Primary Examiner* — Ross Varndell
(74) *Attorney, Agent, or Firm* — Carter, DeLuca & Farrell LLP

(57) ABSTRACT
A teacher data collecting method in a defect classification model for classifying a defect by using, as teacher data, a few pieces of expert data and many pieces of non-expert data, includes: encoding, into one dimension, a latent variable of a variational auto encoder that has been caused to perform learning the expert data; inputting the non-expert data into the variational auto encoder and encoding a latent variable into one dimension; calculating maximum values and minimum values of the latent variable in one dimension of the expert data and the non-expert data; and determining whether to complete collection of the non-expert data, based on a ratio of a difference between the maximum value and the minimum value of the latent variable in one dimension of the non-expert data to a difference between the maximum value and the minimum value of the latent variable in one dimension of the expert data.

3 Claims, 7 Drawing Sheets

(58) Field of Classification Search
CPC ........... G06V 10/7792; G06V 2201/06; G06V
10/774; G06N 20/00; G06T 7/0004;
G06T 2207/20081; G06T 2207/20084;
G06T 2207/30108
See application file for complete search history.

(56) References Cited

U.S. PATENT DOCUMENTS

| | | | |
|---|---|---|---|
| 2021/0011791 A1* | 1/2021 | Okanohara | ......... G06F 11/0703 |
| 2022/0019900 A1 | 1/2022 | Wong | |
| 2022/0067434 A1 | 3/2022 | Nakagawa | |
| 2023/0018848 A1* | 1/2023 | Eline | ...................... G06N 3/088 |
| 2023/0145715 A1* | 5/2023 | Takai | ...................... G01N 21/88 |
| | | | 382/100 |
| 2023/0281791 A1* | 9/2023 | Hyatt | ................... G06V 10/764 |
| | | | 382/141 |
| 2025/0044271 A1* | 2/2025 | Brouwers | .............. G06N 3/084 |

FOREIGN PATENT DOCUMENTS

| | | | | |
|---|---|---|---|---|
| JP | 2009282686 A | | 12/2009 | |
| JP | 2020173576 A | * | 10/2020 | |
| JP | 2021086215 A | | 6/2021 | |
| WO | WO-2021250868 A1 | * | 12/2021 | ............. G06F 13/00 |

OTHER PUBLICATIONS

Chinese Office Action issued by the China National Intellectual Property Administration on Dec. 16, 2025 in corresponding CN Patent Application No. 202310304779.5, with English translation.

* cited by examiner

F I G. 2
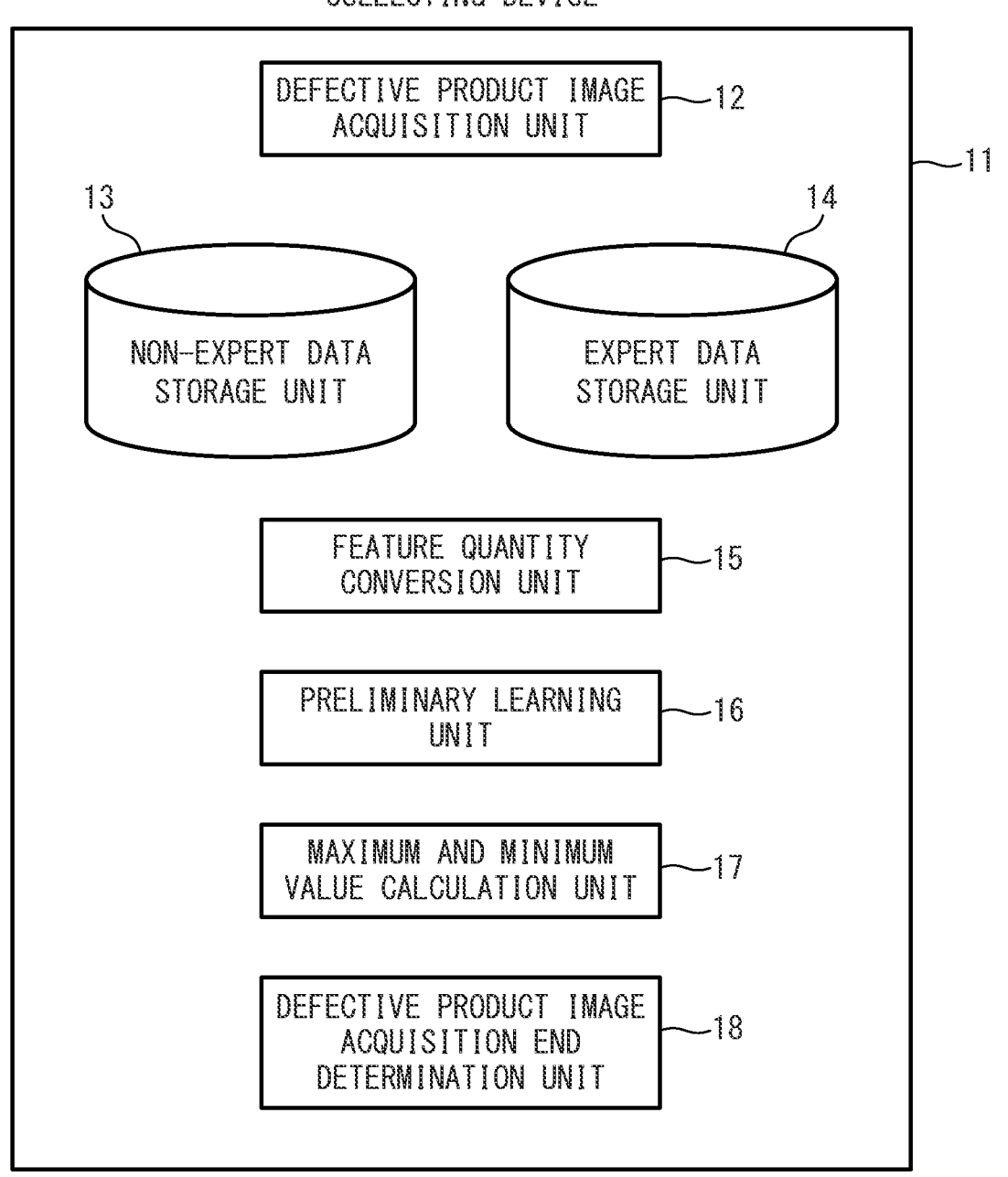
TEACHER DATA
COLLECTING DEVICE
DEFECTIVE PRODUCT IMAGE
ACQUISITION UNIT ——12
——11
13
14
NON-EXPERT DATA
STORAGE UNIT
EXPERT DATA
STORAGE UNIT
FEATURE QUANTITY
CONVERSION UNIT ——15
PRELIMINARY LEARNING
UNIT ——16
MAXIMUM AND MINIMUM
VALUE CALCULATION UNIT ——17
DEFECTIVE PRODUCT IMAGE
ACQUISITION END
DETERMINATION UNIT ——18

F I G. 3
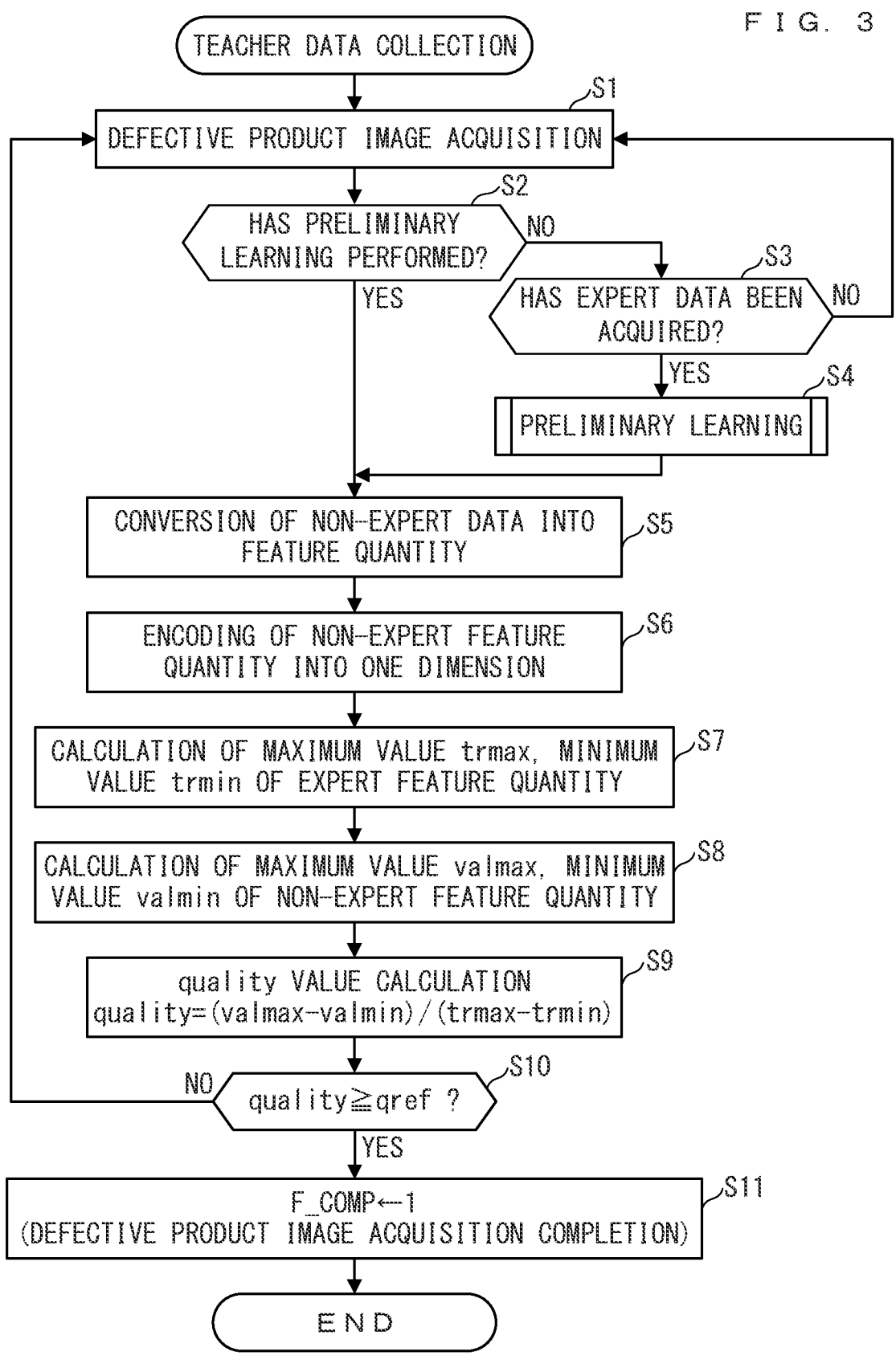

F I G.  4
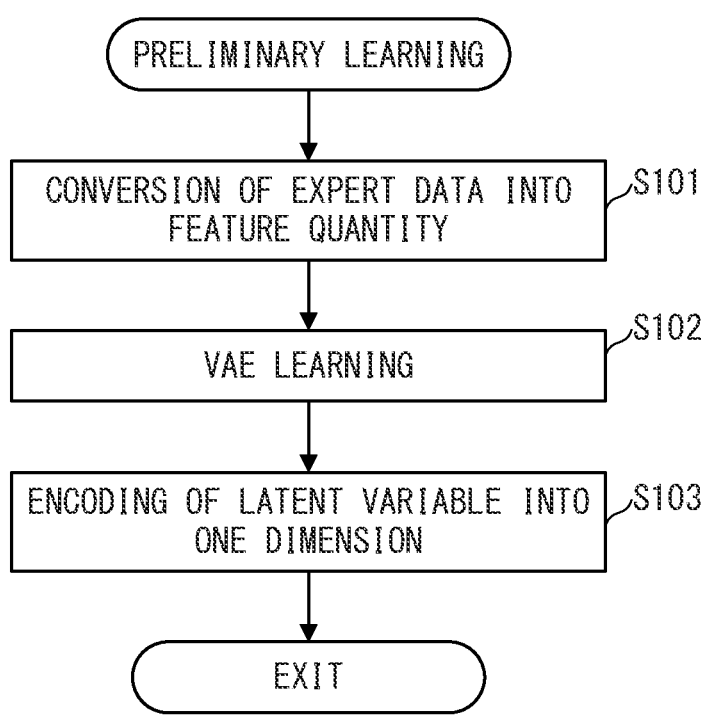

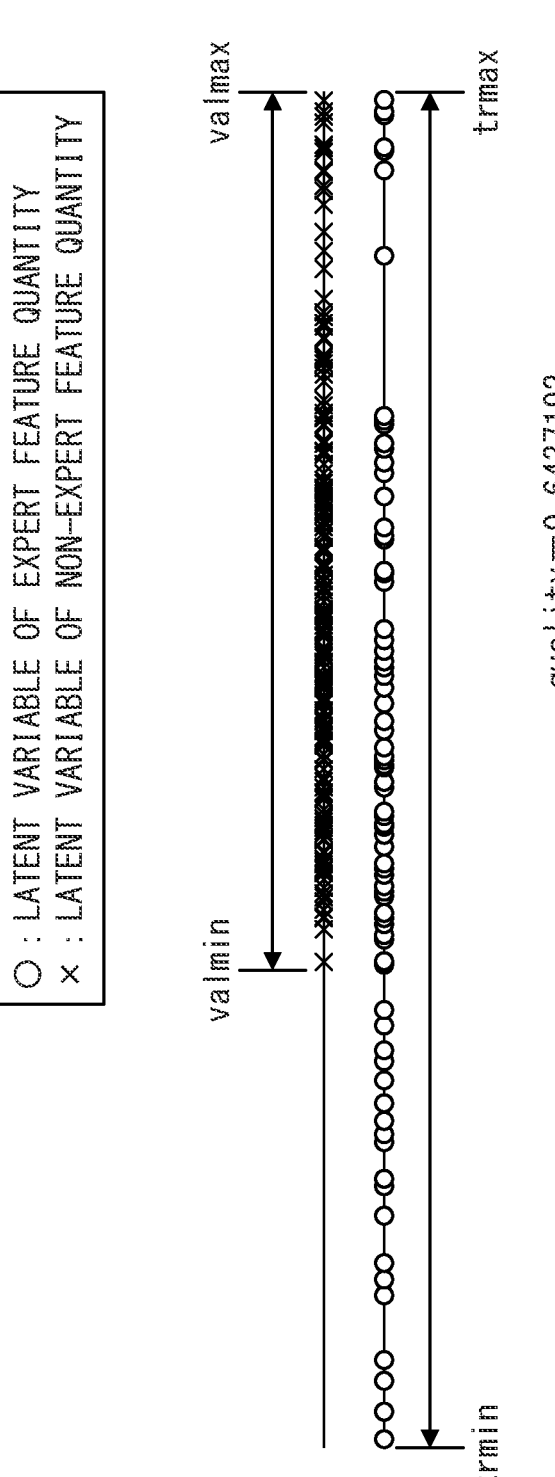
F I G. 5

F I G.  6
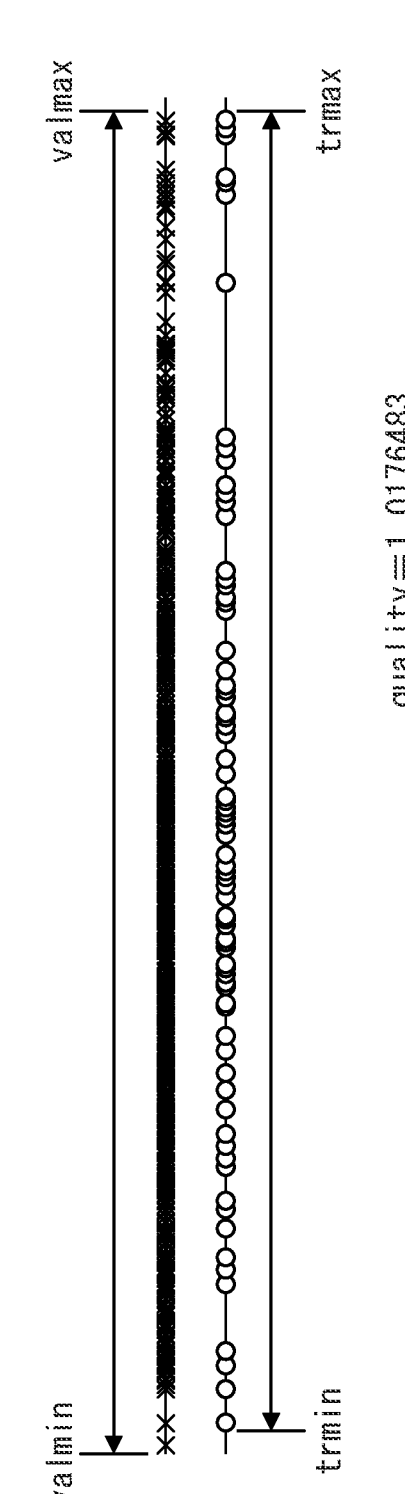

F I G . 7
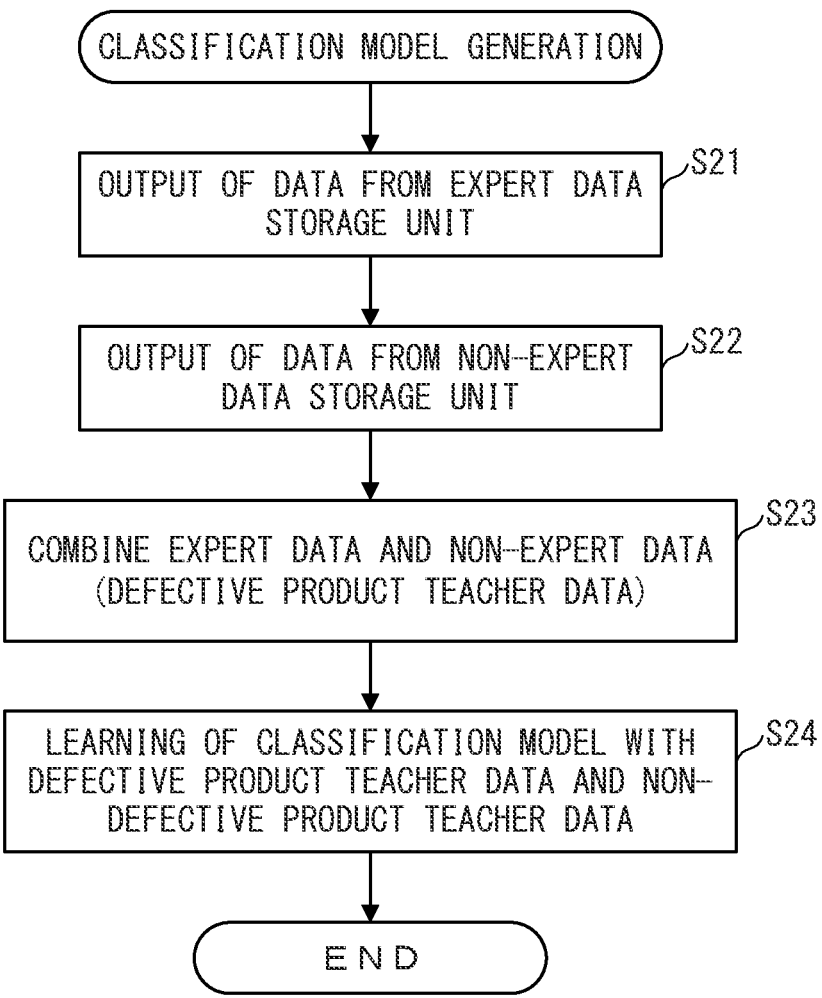

TEACHER DATA COLLECTING METHOD AND COLLECTING DEVICE

BACKGROUND

Technical Field

The present invention relates to a teacher data collecting method and a teacher data collecting device in a learning model to be applied to an inspection device or the like having a machine learning function that uses a neural network so as to determine the quality of an inspected object.

Related Art

In recent years, with an inspection device having a machine learning function that uses a neural network, progress has been made on the development of automation technology in an inspection operation for determining whether inspected objects such as various types of industrial products or parts are each a normal product (non-defective product) or an abnormal product (defective product). In such an inspection device, learning is performed by reading, as teacher data, many pieces of image data of appearances of the inspected objects that have been classified as the non-defective products and the defective products. Then, the inspection device that has learned classification criteria becomes capable of classifying a new inspected object that has been imaged by a camera as a non-defective product or a defective product.

As described above, in the learning by the inspection device, image data of the non-defective product and image data of the defective product are used. In order to improve inspection accuracy, many pieces of image data are necessary for both the non-defective product and the defective product. However, in a manufacturing site of industrial products and the like, in general, the products are manufactured to produce defective products as few as possible, Hence, there are a lot of non-defective products, whereas there are a very few defective products. For this reason, it is more difficult to collect the image data of the defective product (hereinafter, referred to as "defective product data") than the image data of the non-defective product (hereinafter, referred to as "non-defective product data"), which is relatively easily collectable.

In addition, the defective product data includes data to be selected by an expert such as a skilled person or an operator with long years of experience (hereinafter, referred to as "expert data"), and data to be selected by a non-expert such as a new newcomer or an operator with short years of experience (hereinafter, referred to as "non-expert data"). As a device caused to learn the above-described expert data and non-expert data so as to generate a learning model, for example, the device described in JP 2009-110064 A is known.

In JP 2009-110064 A, "expert data" is defined as teacher data to which a label is applied by an expert with abundant knowledge and experience, and labeling accuracy (reliability) is high, whereas "non-expert data" is defined as teacher data to which a label is applied, but its accuracy (reliability) is unclear. In addition, a reliability degree is given to the non-expert data with reference to the expert data. Then, a learning model as a classification model is generated by performing learning using the expert data and the non-expert data applied with the reliability degree.

SUMMARY

The above-described conventional learning model generating method intends to improve the accuracy of the classification model by determining the reliability degree for individual piece of non-expert data and using it for weighting the data in subsequent learning processing. However, nothing is mentioned about how many pieces of non-expert data should be collected to be enough to construct the classification model.

As described above, in the classification model to be used in the inspection device, it is desirable to collect the image data as the teacher data as much as possible. However, in reality, there are limits on the time and cost that can be spent for collecting the teacher data. Hence, there is a demand for minimizing the man-hour to be spent for collecting the teacher data, by completing collection of the teacher data at the time when the teacher data with necessary and sufficient quality and amount that can ensure a certain degree of accuracy in the classification model is obtained.

In addition, when viewing the expert data and the non-expert data in terms of collecting the teacher data, there are drawbacks that in the former case, in trying to obtain a sufficient amount of teacher data with use of the expert data only, a skilled person needs to be on duty for long hours, and thus efficiency in terms of cost is not good, and in the latter case, the types and shapes of abnormal products that can be acquired tend to be average ones, and when using the non-expert data only as the teacher data, it is not possible to accurately classify an abnormal product that is low in occurrence probability. For this reason, by combining the minimum expert data and the non-expert data that is easily collectable, it is important to collect defective product teacher data that ensures the quality, while suppressing the cost.

The present invention has been made to address such drawbacks, and has an object to provide a teacher data collecting method capable of completing collection of teacher data with a minimum man-hour, based on minimum expert data.

In order to achieve the above object, according to a first aspect of the present invention, a teacher data collecting method in a defect classification model for classifying a defect and performing learning by using, as teacher data, relatively a few pieces of expert data corresponding to various defect shapes and relatively many pieces of non-expert data in which corresponding defect shapes are unclear, the teacher data collecting method includes: encoding, into one dimension, a latent variable of a variational auto encoder that has been caused to perform learning beforehand by using feature quantities that have been extracted from the expert data (step 4 in FIG. 3, steps 101 to 103 in FIG. 4); inputting feature quantities that have been extracted from the non-expert data that has been collected into the variational auto encoder that has performed the learning, and encoding a latent variable into the one dimension (steps 5 to 6 in FIG. 3); calculating respectively a maximum value and a minimum value of the latent variable in the one dimension of the feature quantities that have been extracted from the expert data, and a maximum value and a minimum value of the latent variable in the one dimension of the feature quantities that have been extracted from the non-expert data (steps 7 to 8 in FIG. 3); and determining whether to complete collection of the non-expert data, based on a ratio of a difference between the maximum value and the minimum value of the latent variable in the one dimension of the feature quantities that have been extracted from the non-expert data to a difference between the maximum value and the minimum value of the latent variable in the one dimension of the feature quantities that have been extracted from the expert data (steps 9 to 10 in FIG. 3).

In such a teacher data collecting method, learning by a variational auto encoder is performed beforehand by use of the feature quantities that have been extracted from a few pieces of expert data, and the latent variable obtained is encoded into one dimension. Here, the expert data is, for example, data that has been selected beforehand by a skilled operator, and is data corresponding to various defect shapes, that is, data comprehensively including a wide variety of patterns of defect shapes that can occur. Therefore, the feature quantities extracted therefrom are in a distribution state evenly spreading out as a whole, and the standard deviation becomes large. Therefore, in a case where the feature quantities of such expert data are reduced to a one-dimensional latent variable by dimension reduction, the latent variable to be obtained has a large difference between the maximum value and the minimum value.

On the other hand, the non-expert data is, for example, data to be selected on a manufacturing line by an inexperienced newcomer and to be sequentially accumulated, and is assumed to include many pieces of data, in which corresponding defect shapes are unclear, and which are limited to average defect shapes to be relatively easily detected. For this reason, the feature quantities to be extracted from relatively a few pieces of non-expert data at a collection initial stage are likely to be in a distribution state concentrated in the vicinity of the average value, and the standard deviation is likely to be small. Therefore, in order that the standard deviation of the feature quantities extracted from the non-expert data is brought close to the same degree as the standard deviation of the feature quantities extracted from the expert data, thereby obtaining non-expert data having a high quality as teacher data, it is necessary to continue collecting the non-expert data until various patterns of defect shapes are detected and accumulated.

On the basis of such findings, in the present invention, the feature quantities that have been extracted from the collected non-expert data is converted into the one-dimensional latent variable that is the same with the expert data that has been obtained beforehand, and the difference between the maximum value and the minimum value thereof is compared with the difference between the maximum value and the minimum value of the latent variable in the expert data. Accordingly, in comparison with the expert data, it is estimated that to what extent the non-expert data that has been collected by that time corresponds to a wide variety of defect shapes, and it is determined whether the collection of the non-expert data is completed, based on its result. Therefore, it is possible to provide a teacher data collecting method capable of completing collection of the teacher data with a minimum man-hour, based on minimum expert data.

According to a second aspect of the present invention, in the teacher data collecting method described in the first aspect, in the determining, in a case where val max and val min respectively denote the maximum value and the minimum value of the latent variable in the one dimension of the feature quantities that have been extracted from the non-expert data, and tr max and tr min respectively denote the maximum value and the minimum value of the latent variable in the one dimension of the feature quantities that have been extracted from the expert data, a quality value defined by $$\text{quality} = (\text{val max} - \text{val min})/(\text{tr max} - \text{tr min})$$

is calculated, and in a case where the quality value is equal to or greater than a predetermined threshold value qref, the collection of the non-expert data is completed.

According to this configuration, it is determined whether the collection of the non-expert data is to be completed, based on whether the quality value defined as the ratio of the difference between the maximum value and the minimum value in the one-dimensional latent variable of the non-expert data to the difference between the maximum value and the minimum value in the one-dimensional latent variable of the expert data is equal to or greater than the predetermined threshold value qref. Accordingly, it is possible to estimate whether the non-expert data that has been collected by that time corresponds to a wide variety of defect shapes to the same extent as the expert data, and to determine whether the collection of the non-expert data is to be completed, based on its result. Therefore, it is possible to provide a teacher data collecting method capable of completing collection of the teacher data with a minimum man-hour, based on minimum expert data.

According to a third aspect of the present invention, a teacher data collecting device 11 in a defect classification model for classifying a defect and performing learning by using, as teacher data, relatively a few pieces of expert data corresponding to various defect shapes and relatively many pieces of non-expert data in which corresponding defect shapes are unclear, the teacher data collecting device includes: a preliminary learning unit (preliminary learning unit 16 in an embodiment (hereinafter, the same applies in this section)) configured to encode, into one dimension, a latent variable of a variational auto encoder that has been caused to perform learning beforehand by using feature quantities that have been extracted from the expert data; a dimension reduction unit (maximum and minimum value calculation unit 17) configured to input feature quantities that have been extracted from the non-expert data that has been collected into the variational auto encoder that has performed the learning, and to encode a latent variable into the one dimension; a calculation unit (maximum and minimum value calculation unit 17) configured to calculate respectively a maximum value and a minimum value of the latent variable in the one dimension of the feature quantities that have been extracted from the expert data, and a maximum value and a minimum value of the latent variable in the one dimension of the feature quantities that have been extracted from the non-expert data; and a collection completion determination unit (defective product image acquisition end determination unit 18) configured to determine whether to complete collection of the non-expert data, based on a ratio of a difference between the maximum value and the minimum value of the latent variable in the one dimension of the feature quantities that have been extracted from the non-expert data to a difference between the maximum value and the minimum value of the latent variable in the one dimension of the feature quantities that have been extracted from the expert data.

In such a teacher data collecting device, the feature quantities that have been extracted from the collected non-expert data is converted into a one-dimensional latent variable that is the same with the expert data that has been obtained beforehand, and the difference between the maximum value and the minimum value thereof is compared with the difference between the maximum value and the minimum value of the latent variable in the expert data. Accordingly, in comparison with the expert data, it is estimated that to what extent the non-expert data that has been collected by that time corresponds to a wide variety of defect shapes, and it is determined whether the collection of the non-expert data is completed, based on its result. Therefore, it is possible to provide a teacher data collecting device capable of completing collection of the teacher data with a minimum man-hour, based on minimum expert data.

BRIEF DESCRIPTION OF DRAWINGS

FIG. 2 is a block diagram illustrating the teacher data collecting device according to an embodiment of the present invention;

FIG. 3 is a flowchart illustrating collection processing of teacher data by the teacher data collecting device;

FIG. 4 is a flowchart illustrating preliminary learning processing by the teacher data collecting device;

FIG. 5 is a diagram for describing calculation of a Quality value;

FIG. 6 is a diagram for describing calculation of the Quality value; and model.

FIG. 7 is a flowchart illustrating generation processing of a classification

DETAILED DESCRIPTION

Figure 1:
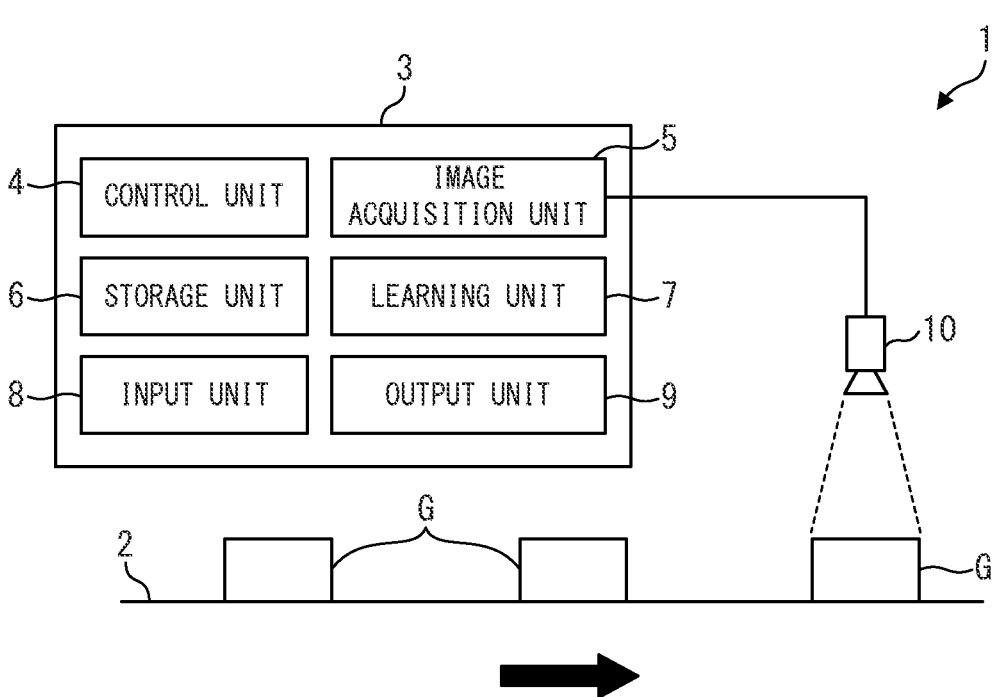
FIG. 1 is a diagram for describing an outline of an inspection system in which teacher data that has been collected by a teacher data collecting device according to an embodiment of the present invention is used for learning.

Hereinafter, preferred embodiments of the present invention will be described in detail with reference to the drawings. FIG. 1 illustrates an inspection system including a classification model by which learning has been performed by use of data of a large number of defective product images (defective product data) that have been collected by a teacher data collecting device 11 to be described later and data of a large number of non-defective product images (non-defective product data). Such an inspection system 1 is installed in, for example, a manufacturing factory of vehicle components, and by inspecting the appearance of a vehicle component, automatically determines whether a manufactured vehicle component (for example, a cylinder block) is a normal product (non-defective product) or an abnormal product (defective product). Hereinafter, a vehicle component to be inspected will be referred to as an "inspected object".

As illustrated in FIG. 1, the inspection system 1 includes a conveyor 2 for conveying an inspected object G in a predetermined direction at a predetermined speed, and an inspection device 3 for determining the quality of the inspected object G, when the inspected object G reaches a predetermined inspection position. Note that the illustration is omitted, but the inspected object G that has been determined to be a defective product by the inspection device 3 is removed from the conveyor 2, or is conveyed to a storage place dedicated to the defective products.

The inspection device 3 is configured with an information processing device mainly including a computer, and includes a control unit 4, an image acquisition unit 5, a storage unit 6, a learning unit 7, an input unit 8, an output unit 9, and a camera 10.

The control unit 4 includes a CPU, and controls the above respective units 5 to 9 of the inspection device 3, and the camera 10. The image acquisition unit 5 acquires, as digital data, an external appearance image of the inspected object G that has been imaged by the camera 10. The storage unit 6 includes a ROM and a RAM, stores various programs to be used in the control of the inspection device 3, and also stores various types of data. The learning unit 7 includes a learning model by which criteria for determining the quality of the inspected object G have been learned. The input unit 8 includes a keyboard and/or a mouse to be operated by an operator, and in addition, is configured so that data and/or signals can be input from the outside. The output unit 9 includes a display device such as a display on which a determination result of the inspected object G is displayed.

FIG. 2 illustrates a teacher data collecting device 11 according to an embodiment of the present invention. The teacher data collecting device 11 is operated by an operator who performs an inspection operation of the inspected object G so as to collect defective product data. Similarly to the inspection device 3 described above, the teacher data collecting device 11 is configured with an information processing device including a computer, and includes a defective product image acquisition unit 12, a non-expert data storage unit 13, an expert data storage unit 14, a feature quantity conversion unit 15, a preliminary learning unit 16 (preliminary learning unit, dimension reduction unit), a maximum and minimum value calculation unit 17 (dimension reduction unit, calculation unit), and a defective product image acquisition end determination unit 18 (collection completion determination unit).

Regarding an external appearance image of the inspected object G that has been imaged by a camera similar to the camera 10 of the inspection device 3 described above, the defective product image acquisition unit 12 acquires, as defective product data, the external appearance image that has been determined to be a defective product by the operator.

The non-expert data storage unit 13 stores defective product data (non-expert data) that has been selected by non-experts (newcomers or operators with short years of experience in the inspection operation). On the other hand, the expert data storage unit 14 stores defective product data (expert data) that has been selected by experts (skilled persons or operators with long years of experience in the inspection operation). Note that the non-expert data and the expert data may include actual defective product data that has been respectively selected by the non-expert and the expert, and may additionally include pseudo defective product data that has been generated by use of, for example, a variational auto encoder (VAE) or a generative adversarial network (GAN), based on the actual defective product data.

The feature quantity conversion unit 15 converts each the expert data and the non-expert data into predetermined feature quantities. Specifically, the feature quantities are extracted from each piece of defective product data, by use of, for example, scale-invariant feature transform (SIFT) or convolutional neural network (CNN). The feature quantity conversion unit 15 may extract feature quantities by using an encoder of the VAE.

The preliminary learning unit 16 includes a VAE, and performs preliminary learning using only the feature quantities that have been obtained from the expert data as training data. In such preliminary learning, the feature quantities that have been extracted from the expert data are input into the encoder of the VAE, and a latent variable z is learned so that feature quantities approximate to the feature quantities that have been input can be output (preliminary learning step). In particular, such preliminary learning is characterized as encoding the latent variable z into one dimension. By encoding the latent variable z into one dimension, it becomes possible to estimate the extent of the spread in the distribution of the input data, that is, in this case, the extent of the spread in the distribution of the defect shape in the defective product data that has been input, based on a difference between the maximum value and the minimum value thereof.

The maximum and minimum value calculation unit 17 inputs the feature quantities that have been extracted from the collected non-expert data into the learned VAE, and encodes the feature quantities into the latent variable z in the same one dimension (dimension reducing step). In addition, the maximum value and the minimum value of the feature quantities of the expert data that have been encoded into the latent variable z in one dimension by the preliminary learning unit 16 are respectively calculated as tr max and tr min, and in addition, the maximum value and the minimum value of the feature quantities of the non-expert data that have been encoded into the latent variable z in the same one dimension are respectively calculated as val max and val min (calculating step).

The defective product image acquisition end determination unit 18 determines whether to complete the collection of the non-expert data, based on a ratio of a difference between val max and val min that have been calculated to a difference between tr max and tr min (collection completion determining step).

FIG. 3 illustrates collection processing of the defective product data as the teacher data by the teacher data collecting device 11 described above. In the present processing, first, step 1 (indicated as "S1" in the drawing. Hereinafter, the same will apply), a defective product image is acquired. Here, in a case where the defective product image that has been acquired is selected by a non-expert, such a defective product image is stored, as non-expert data, in the non-expert data storage unit 13. On the other hand, in a case where the defective product image that has been acquired is selected by an expert, the defective product image is stored as expert data, in the expert data storage unit 14.

It can be configured to determine which one of the expert or the non-expert has selected the acquired defective product image, based on, for example, an attribute value of an operator who makes an input when operating the teacher data collecting device 11. Alternatively, it can also be configured to acquire a defective product image to which a label indicating which one of the expert or the non-expert selected has been applied beforehand. In the present embodiment, it is sufficient if a few pieces of expert data are to be acquired. Therefore, a label indicating that the selection has been made by the expert is applied to the expert data beforehand, and the determination of the expert data or the non-expert data is made in accordance with the presence or absence of such a label.

Next, in step 2, it is determined whether the preliminary learning has already been performed. In a case where the preliminary learning has already been performed, the processing proceeds to step 5. On the other hand, in a case where the preliminary learning has not been performed yet, the processing proceeds to step 3.

In step 3, it is determined whether a preset amount of the expert data has already been acquired. Here, the expert data is demanded to be data corresponding to various defect shapes, that is, data comprehensively including a wide variety of patterns of defect shapes that can occur. Therefore, it is possible to set and acquire minimum pieces of expert data that satisfy this condition. Regarding the number of such minimum pieces of expert data, it may be configured to continue acquiring data until the standard deviation of the feature quantities that have been extracted from the collected expert data exceeds a predetermined threshold value, or any value may be set, based on an empirical rule. In the present embodiment, the number of minimum pieces of expert data can be set to, for example, "100". In a case where a determination result in step 3 is YES, the processing proceeds to step 4 to perform the preliminary learning. On the other hand, in a case where the determination result of step 3 is NO, the processing returns to step 1, and the defective product image is acquired again.

FIG. 4 illustrates each processing of the preliminary learning in step 4. First, in step 101, the expert data that has been acquired is converted into predetermined feature quantities, by use of, for example, the SIFT or the CNN.

Next, in step 102, learning of the VAE is performed with the feature quantities that have been obtained from the expert data, as the training data. Specifically, the feature quantities that have been obtained from the expert data are input into the encoder of the VAE, and the latent variable z is learned so that feature quantities approximate to the feature quantities that have been input can be output.

Note that the extraction of the feature quantities in step 101 described above may be performed by an encoder of the VAE, and the extraction of the feature quantities in step 101 and the learning of the latent variable z in step 102 may be performed simultaneously in parallel with each other by a single VAE. In this case, the image data that is expert data is set as an input value into the VAE, learning of the latent variable z is performed so that image data approximate to this can be generated, and thus it is possible to obtain the feature quantities and the latent variable z simultaneously.

Next, in step 103, the latent variable z that has been obtained is then further compressed and encoded into one dimension. By encoding the latent variable z into one dimension, and viewing the difference between the maximum value and the minimum value in the latent variable z, it becomes possible to estimate the extent of the spread in the distribution of the input data, that is, the extent of the spread in the distribution of the defect shape in the expert data. The preliminary learning is completed by the end of the processing in step 103, and the processing proceeds to step 5 in FIG. 3.

In step 5, the non-expert data that has been acquired is converted into predetermined feature quantities by use of, for example, the SIFT or the CNN. Next, in step 6, the feature quantities that have been obtained from the non-expert data are input into the above-described learned VAE, and the latent variable z is encoded into one dimension.

Note that as described above, in a case where learning of the VAE is performed with the image data itself that is the expert data as an input value, the image data itself that is the non-expert data may be similarly input directly into the learned VAE to encode the latent variable z into one dimension. In this case, step 5 and step 6 are performed simultaneously in parallel with each other.

Next, in step 7, the maximum value tr max and the minimum value tr min in the latent variable z in one dimension of the feature quantities of the expert data are respectively calculated, and subsequently in step 8, the maximum value val max and the minimum value val min in the latent variable z in one dimension of the feature quantities of the non-expert data are respectively calculated.

Then, in step 9, a quality value defined by $$quality = (val\ max - val\ min)/(tr\ max - tr\ min)$$

is calculated. That is, the quality value denotes a ratio of a difference between the maximum value val max and the minimum value val min in the latent variable z in one dimension of the feature quantities of the non-expert data to a difference between the maximum value tr max and the minimum value tr min in the latent variable z in one dimension of the feature quantities of the expert data.

In the present embodiment, the latent variable z has been encoded into one dimension. Thus, the difference between the maximum value and the minimum value of the latent variable z in one dimension reflects a spreading degree in the distribution of the input data. As described above, the feature quantities to be extracted from relatively a few pieces of non-expert data at a collection initial stage of the defective product image are likely to be in a distribution state concentrated in the vicinity of the average value, and the standard deviation is likely to be small. In such a case, as illustrated in FIG. 5, the difference between the maximum value val max and the minimum value val min in the latent variable z of the feature quantities of the non-expert data is smaller than the difference between the maximum value tr max and the minimum value tr min in the latent variable z of the feature quantities of the expert data. Therefore, the quality value becomes a small value that is equal to or smaller than 1 (In FIG. 5, the quality value≈0.64).

On the other hand, as the accumulation of the non-expert data progresses and includes data of various defect shapes, the distribution of the feature quantities to be extracted from the non-expert data spreads out, and the standard deviation becomes large. In a case where the non-expert data sufficiently spreads out, as illustrated in FIG. 6, the difference between the maximum value val max and the minimum value val min in the latent variable z of the feature quantities of the non-expert data is almost the same with or greater than the difference between the maximum value tr max and the minimum value tr min in the latent variable z of the feature quantities of the expert data. Therefore, the quality value is a value close to 1 or a large value that is equal to or greater than 1 (In FIG. 6, the quality value≈1.02).

In this manner, by referring to the quality value, it is possible to estimate to what extent the distribution of the defect shape in the non-expert data that has been collected by that time is close to the distribution of the defect shape in the expert data. In addition, accordingly, it is possible to estimate whether the quality of the non-expert data as the teacher data has become sufficient, and it is possible to determine whether the acquisition of the defective product image may be completed.

On the basis of such findings, in step 10, it is determined whether the quality value that has been calculated is equal to or greater than a predetermined threshold value qref. In a case where the quality value is equal to or greater than the threshold value qref, the threshold value qref is set to a value from which it is possible to estimate that the distribution of the defect shape in the non-expert data is sufficiently close to the distribution of the defect shape in the expert data. In the present embodiment, the threshold value qref is set to, for example, 0.95.

In a case where a determination result in step 10 is NO and the quality value is smaller than the threshold value qref, it is determined that the non-expert data has not been sufficiently accumulated yet, the processing returns to step 1 to continue acquiring a defective product image.

On the other hand, in a case where the determination result in step 10 is YES and quality≥qref is satisfied, the non-expert data has already been sufficiently accumulated and it is determined that the acquisition of the defective product image may be completed. In step 11, "1" is set to a defective product image acquisition completion flag F_COMP, and the teacher data collection processing ends. Note that by setting "1" to the flag F_COMP, in the teacher data collecting device 11, the collection of the teacher data having been completed is notified on a display unit, not illustrated, or the like.

FIG. 7 illustrates generation processing of a classification model serving as a learning model to be mounted on the learning unit 7 of the inspection device 3 in the inspection system 1 described above. In the present processing, all pieces of data (expert data) are output from the expert data storage unit 14 of the teacher data collecting device 11 in step 21, and all pieces of data (non-expert data) are output from the non-expert data storage unit 13 in step 22. Next, in step 23, the expert data and the non-expert data that have been output are combined together. Accordingly, many pieces of defective product teacher data to be used for generating the classification model are created.

Then, in step 24, learning of the classification model is performed by use of many pieces of defective product teacher data that have been created and many pieces of non-defective product data (non-defective product teacher data) that have been separately collected. Accordingly, the classification model with high classification accuracy is obtainable, and in the inspection system 1, the quality of the inspected object G can be determined with accuracy.

Heretofore, as described in detail, according to the present embodiment, it is determined whether to complete the acquisition of the defective product image, based on the ratio of the difference between the maximum value val max and the minimum value val min in the latent variable z in one dimension of the feature quantities of the non-expert data to the difference between the maximum value tr max and the minimum value tr min in the latent variable z in one dimension of the feature quantities of the expert data. Therefore, the collection of teacher data can be completed with a minimum man-hour, based on minimum expert data.

Note that the present invention is not limited to the above-described embodiments, and can be implemented in various modes. For example, in an embodiment, the non-expert data and the expert data are configured to be respectively stored in the non-expert data storage unit 13 and the expert data storage unit 14 included in the teacher data collecting device 11. However, the non-expert data and the expert data may be stored in an external storage device, and it may be configured to read the data via a communication unit, not illustrated, when needed. In addition, the non-expert data and the expert data may be labeled to distinguish between them, and then may be stored in a single storage unit. In addition, the detailed configuration and the like of the teacher data collecting device 11, which have been described in the embodiments are merely examples, and can be appropriately changed within the scope of the gist of the present invention.

What is claimed is:

1. A teacher data collecting method in a defect classification model for classifying a defect and performing learning by using, as teacher data, expert data corresponding to various defect shapes and non-expert data prepared more than the expert data in which corresponding defect shapes are unclear, the teacher data collecting method comprising:

performing preliminary learning with a variational auto encoder on feature quantities extracted from the expert data, the variational auto encoder being configured to process large- volume feature data and to encode a latent variable into one dimension for estimating a distribution spread of the expert data;

encoding, into one dimension, a latent variable of the variational auto encoder that has been caused to perform learning beforehand by using feature quantities that have been extracted from the expert data;

inputting feature quantities that have been extracted from the non-expert data that has been collected into the variational auto encoder that has performed the learning, and encoding a latent variable into the one dimension;

calculating respectively a maximum value and a minimum value of the latent variable in the one dimension of the feature quantities that have been extracted from the expert data, and a maximum value and a minimum value of the latent variable in the one dimension of the feature quantities that have been extracted from the non-expert data; and determining whether to complete collection of the non-expert data, based on a ratio of a difference between the maximum value and the minimum value of the latent variable in the one dimension of the feature quantities that have been extracted from the non-expert data to a difference between the maximum value and the minimum value of the latent variable in the one dimension of the feature quantities that have been extracted from the expert data.

2. The teacher data collecting method according to claim 1, wherein in the determining, in a case where valmax and valmin respectively denote the maximum value and the minimum value of the latent variable in the one dimension of the feature quantities that have been extracted from the non-expert data, and trmax and trmin respectively denote the maximum value and the minimum value of the latent variable in the one dimension of the feature quantities that have been extracted from the expert data, a quality value defined by $$\text{quality} = (\text{val max} - \text{val min})/(\text{tr max} - \text{tr min})$$

is calculated, and in a case where the quality value is equal to or greater than a predetermined threshold value, the collection of the non-expert data is completed.

3. A teacher data collecting device in a defect classification model for classifying a defect and performing learning by using, as teacher data, expert data corresponding to various defect shapes and non-expert data prepared more than the expert data in which corresponding defect shapes are unclear, wherein the teacher data collecting device comprises an information processing device including a computer, the information processing device is configured to:

perform preliminary learning with a variational auto encoder on feature quantities extracted from the expert data, the variational auto encoder being configured to process large- volume feature data and to encode a latent variable into one dimension for estimating a distribution spread of the expert data;

encode, into one dimension, a latent variable of the variational auto encoder that has been caused to perform learning beforehand by using feature quantities that have been extracted from the expert data;

input feature quantities that have been extracted from the non-expert data that has been collected into the variational auto encoder that has performed the learning, and to encode a latent variable into the one dimension;

calculate respectively a maximum value and a minimum value of the latent variable in the one dimension of the feature quantities that have been extracted from the expert data, and a maximum value and a minimum value of the latent variable in the one dimension of the feature quantities that have been extracted from the non- expert data; and determine whether to complete collection of the non-expert data, based on a ratio of a difference between the maximum value and the minimum value of the latent variable in the one dimension of the feature quantities that have been extracted from the non-expert data to a difference between the maximum value and the minimum value of the latent variable in the one dimension of the feature quantities that have been extracted from the expert data.

* * * * *